United States Patent
Aoyama et al.

(10) Patent No.: US 12,339,388 B2
(45) Date of Patent: Jun. 24, 2025

(54) VEHICLE EXTERIOR COMPONENT AND ELECTROMAGNETIC WAVE RADAR SYSTEM

(71) Applicant: TOYODA GOSEI CO., LTD., Kiyosu (JP)

(72) Inventors: Shunsuke Aoyama, Kiyosu (JP); Koji Okumura, Kiyosu (JP); Takeshi Sugiyama, Nara (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 355 days.

(21) Appl. No.: 18/181,995

(22) Filed: Mar. 10, 2023

(65) Prior Publication Data

US 2023/0314558 A1  Oct. 5, 2023

(30) Foreign Application Priority Data

Mar. 30, 2022 (JP) .................. 2022-056106

(51) Int. Cl.
*G01S 13/931* (2020.01)
*G01S 7/02* (2006.01)

(52) U.S. Cl.
CPC ............ *G01S 7/028* (2021.05); *G01S 13/931* (2013.01); *G01S 2013/93271* (2020.01)

(58) Field of Classification Search
CPC ............ G01S 7/028; G01S 13/931; G01S 2013/93271; G01S 7/03; G01S 2013/93277; G01S 7/02; G01S 7/411; H01Q 1/3233; H01Q 1/422; H01Q 17/001; B60Q 1/0023; B60R 11/00
See application file for complete search history.

(56) References Cited

U.S. PATENT DOCUMENTS

| | | | |
|---|---|---|---|
| 11,092,666 B2 * | 8/2021 | Fukui | ............ G01S 7/032 |
| 2018/0013196 A1 | 1/2018 | Sakurai et al. | |
| 2020/0124702 A1 | 4/2020 | Fukui et al. | |
| 2021/0210846 A1 | 7/2021 | Sekiguchi | |
| 2022/0155409 A1 | 5/2022 | Stablo et al. | |

FOREIGN PATENT DOCUMENTS

| | | | |
|---|---|---|---|
| EP | 4024611 A1 | | 7/2022 |
| JP | 5132656 B2 * | | 1/2013 |
| JP | 6327194 B2 | | 5/2018 |
| JP | 6602503 B1 | | 11/2019 |

OTHER PUBLICATIONS

Office Action mailed on Feb. 12, 2025 in corresponding Japanese Patent Application No. 2022-056106 (and English translation attached).

* cited by examiner

*Primary Examiner* — Vladimir Magloire
*Assistant Examiner* — Bongani Jabulani Mashele
(74) *Attorney, Agent, or Firm* — Posz Law Group, PLC (57) ABSTRACT

A vehicle exterior component includes a cover, a housing, and a substrate. The cover is configured to arranged forward of a radar device in an emission direction of electromagnetic waves. The housing covers a rear surface of the cover. The substrate is arranged in the housing. The substrate includes a light emitting unit configured to emit visible light. The cover forms an angle in a range of 0° to 5° with respect to an orthogonal plane that is orthogonal to the emission direction. The rear wall of the housing faces the cover in the emission direction and forms an angle in a range of 2° to 10° with respect to the orthogonal plane.

5 Claims, 8 Drawing Sheets

VEHICLE EXTERIOR COMPONENT AND ELECTROMAGNETIC WAVE RADAR SYSTEM

BACKGROUND

1. Field

The present disclosure relates to a vehicle exterior component through which electromagnetic waves such as millimeter waves are transmitted, and an electromagnetic wave radar system including the vehicle exterior component.

2. Description of Related Art

A millimeter wave radar device installed in a land vehicle typically emits millimeter waves to the outside of the land vehicle. When the millimeter waves that are emitted from the millimeter wave radar device hit and are reflected by an object outside the land vehicle, such as a leading land vehicle or a pedestrian, the millimeter waves are received by the millimeter wave radar device. Based on the emitted and received millimeter waves, the millimeter wave radar device recognizes the object and detects the distance and the relative velocity between the land vehicle and the object.

The above-described land vehicle typically includes an emblem through which millimeter waves are transmitted. The emblem is located forward of the millimeter wave radar device in the emission direction of millimeter waves (for example, Japanese Patent No. 5132656). In such a land vehicle, a light emitting device for illuminating the emblem is disposed between the millimeter wave radar device and the emblem.

The above-described emblem and the light emitting device have millimeter wave transmissivity. The millimeter waves emitted and received by the millimeter wave radar device are attenuated when being transmitted through the emblem and the light emitting device. As such, there is room for improvement in reducing the attenuation amount of millimeter waves transmitted through the emblem and the light emitting device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first general aspect, a vehicle exterior component is configured to be used in a vehicle on which a radar device is mounted. The radar device emits and receives electromagnetic waves. The vehicle exterior component includes a cover configured to be arranged forward of the radar device in an emission direction of the electromagnetic waves, a housing that covers a rear surface of the cover, and a substrate arranged in the housing. The substrate includes a light emitting unit configured to emit visible light. The cover forms an angle in a range of 0° to 5° with respect to an orthogonal plane that is orthogonal to the emission direction. A rear wall of the housing faces the cover in the emission direction and forms an angle in a range of 2° to 10° with respect to the orthogonal plane.

In a second general aspect, a vehicle exterior component is configured to be used in a vehicle on which a radar device is mounted. The radar device emits and receives electromagnetic waves. The vehicle exterior component includes a cover configured to be arranged forward of the radar device in an emission direction of the electromagnetic waves, a housing that covers a rear surface of the cover, and a substrate arranged in the housing. The substrate includes a light emitting unit configured to emit visible light. The substrate is disposed adjacent to an emission range of the electromagnetic waves. The vehicle exterior component is configured such that: an electromagnetic wave absorber is provided at an end of the substrate that faces the emission range of the electromagnetic waves, the electromagnetic wave absorber absorbing the electromagnetic waves; or a distance exists between the end of the substrate that faces the emission range of the electromagnetic waves and the emission range of the electromagnetic waves.

In a third general aspect, an electromagnetic wave radar system is provided that includes the above-described vehicle exterior component and the radar device. A distance between the cover and the rear wall of the housing at a center of the emission range of the millimeter waves is equal to an integer multiple of half of a wavelength of the millimeter waves in air.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An electromagnetic wave radar system 12 for a vehicle according to one embodiment will now be described with reference to the drawings. In the present embodiment, the electromagnetic wave radar system 12 is used in a land vehicle 11. In the following description, the direction in which the land vehicle 11 advances forward will be referred to as the front, and the reverse direction will be referred to as the rear. The up-down direction refers to the up-down direction of the land vehicle 11, and the vehicle width direction refers to the left-right direction of the land vehicle 11.

<Electromagnetic Wave Radar System 12>

Figure 1:
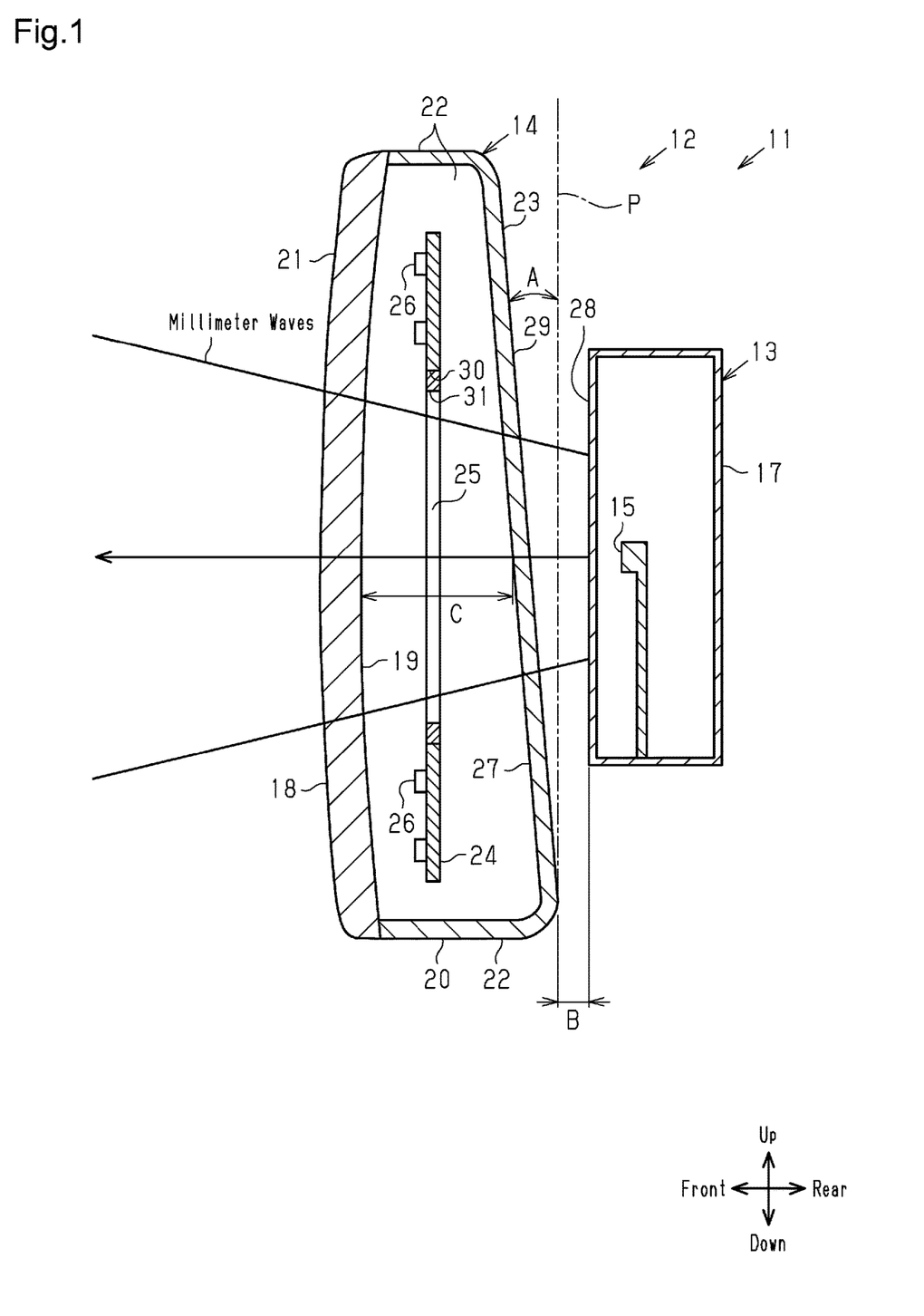
FIG. 1 is a schematic cross-sectional side view showing an electromagnetic wave radar system according to one embodiment.
Figure 2:
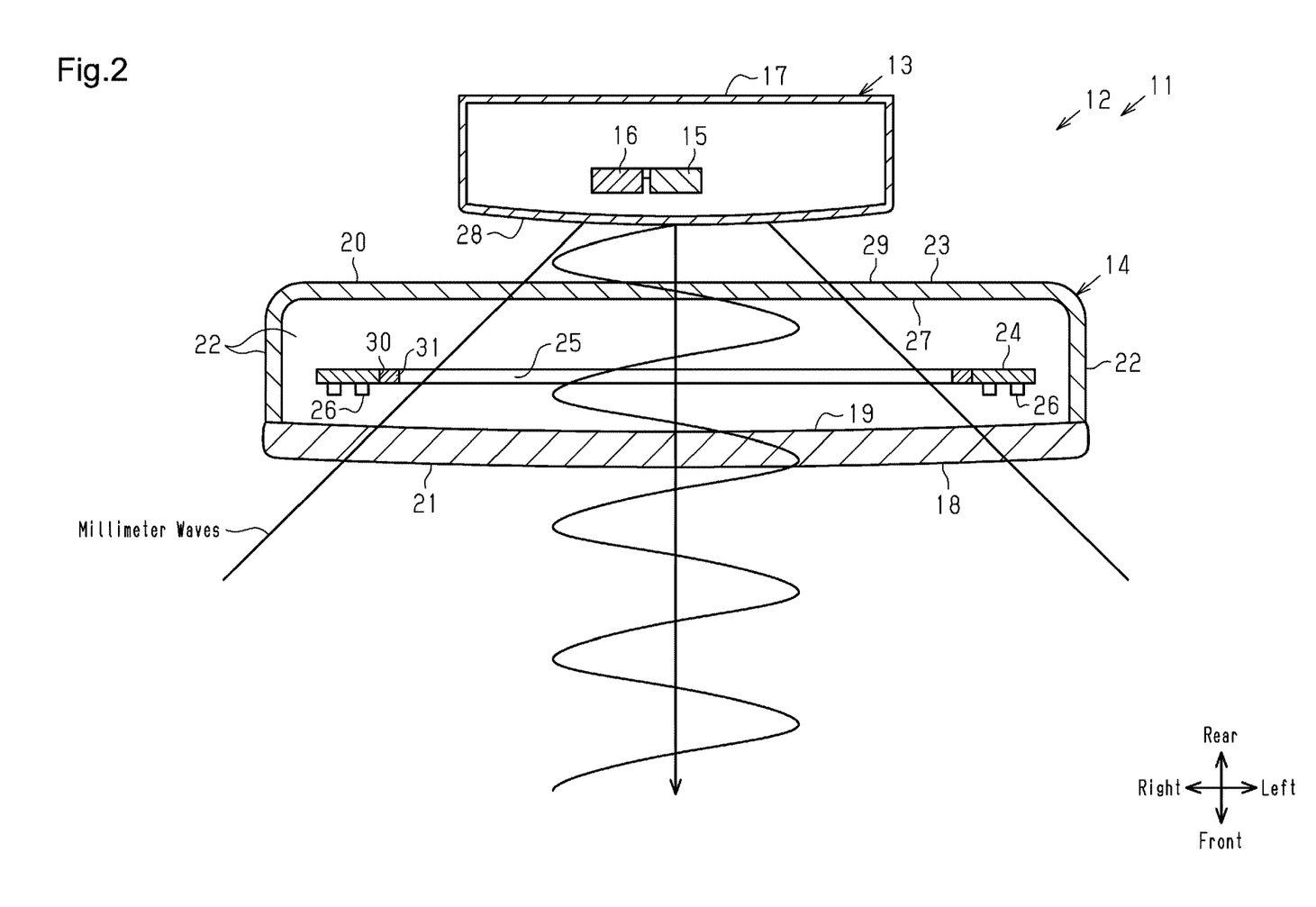
FIG. 2 is a plan view of FIG. 1.

As shown in FIGS. 1 and 2, the electromagnetic wave radar system 12 is installed at a center in the vehicle width direction in a front end portion of the land vehicle 11, which is an example of a vehicle. The electromagnetic wave radar system 12 includes a front monitoring millimeter wave radar device 13 and a land vehicle exterior component 14. The millimeter wave radar device 13 is an example of a radar device that emits and receives electromagnetic waves. The land vehicle exterior component 14 is an example of a vehicle exterior component arranged in front of the millimeter wave radar device 13.

<Millimeter Wave Radar Device 13>

As shown in FIGS. 1 and 2, the millimeter wave radar device 13 includes an emitting unit 15, a receiving unit 16, and a case 17. The emitting unit 15 emits millimeter waves, which are electromagnetic waves, forward to the outside of the land vehicle 11. The receiving unit 16 receives the millimeter waves emitted from the emitting unit 15 and reflected by a detection target such as an object outside the land vehicle 11.

The case 17 accommodates the emitting unit 15 and the receiving unit 16. The case 17 has a hollow rectangular parallelepiped shape. The emitting unit 15 and the receiving unit 16 are arranged side by side, for example, in the vehicle width direction (left-right direction) at the center of the case 17. The case 17 has millimeter wave transmissivity.

Millimeter waves are radio waves with wavelengths of 1 mm to 10 mm and frequencies of 30 GHz to 300 GHz. In the millimeter wave radar device 13 of the present embodiment, millimeter waves of which the frequency is 77 GHz are used. The wavelength λ of the millimeter waves of which the frequency is 77 GHz in air is 4 mm. The millimeter waves used by the millimeter wave radar device 13 of the present example are horizontally polarized waves, in which the electric field oscillates along the horizontal plane when the land vehicle 11 is on a horizontal ground.

When the land vehicle 11 is on a ground surface inclined with respect to the horizontal plane, the electric field of the millimeter waves emitted from the millimeter wave radar device 13 oscillates along a plane parallel to the ground. In other words, the electric field of the millimeter waves emitted from the millimeter wave radar device 13 oscillates along a plane inclined by the same amount as the land vehicle 11 with respect to the horizontal plane in accordance with the inclination of the land vehicle 11 with respect to the horizontal plane.

As described above, the millimeter wave radar device 13 emits millimeter waves forward from the land vehicle 11. Thus, the emission direction of the millimeter waves from the millimeter wave radar device 13 is the direction from the rear toward the front of the land vehicle 11. The front in the emission direction of the millimeter waves substantially agrees with the front of the land vehicle 11. The rear in the emission direction also substantially agrees with the rear of the land vehicle 11. Accordingly, in the following description, the front in the emission direction of the millimeter waves will simply be referred to as "forward" or "front." The rear in the emission direction will simply be referred to as "rearward" or "rear."

<Land Vehicle Exterior Component 14>

As shown in FIGS. 1 and 2, the land vehicle exterior component 14 is disposed in front of the millimeter wave radar device 13 in the millimeter wave emission direction. The land vehicle exterior component 14 includes a plate-shaped cover 18 and a housing 20. The housing 20 covers a rear surface 19 of the cover 18 and has a shape of a box with a closed end. The front end of the housing 20 is open.

<Cover 18>

As shown in FIGS. 1 and 2, the cover 18 has millimeter wave transmissivity (electromagnetic wave transmissivity) and visible light transmissivity. The cover 18 is made of, for example, a plastic. The cover 18 is, for example, an emblem. The cover 18 is arranged to be upright such that a front surface 21 faces forward with respect to the land vehicle 11 and the rear surface 19 faces rearward with respect to the land vehicle 11. The cover 18 closes the front opening of the housing 20.

The cover 18 is curved so as to bulge slightly forward. Specifically, the front surface 21 and the rear surface 19 of the cover 18 are curved so as to bulge slightly forward. The front surface 21 of the cover 18 is exposed to the outside of the land vehicle 11 and forms an ornamental surface of the cover 18.

When the shape of the cover 18 is approximated to a shape of a flat plate, it is preferable that the cover 18 be disposed to form an angle in a range of 0° to 5° with respect to an orthogonal plane P that is orthogonal to the emission direction (direction from the rear to the front) of the millimeter waves emitted from the emitting unit 15 of the millimeter wave radar device 13. That is, when the shape of the cover 18 is approximated to a shape of a flat plate, the cover 18 is preferably disposed such that the angle of inclination in the front-rear direction with respect to the orthogonal plane P is in a range of 0° to 5°. When the shape of the cover 18 is approximated to a shape of a flat plate, it is more preferable that the cover 18 is disposed such that its angle with respect to the orthogonal plane P is 0°, that is, the cover 18 is preferably parallel to the orthogonal plane P.

Figure 3:
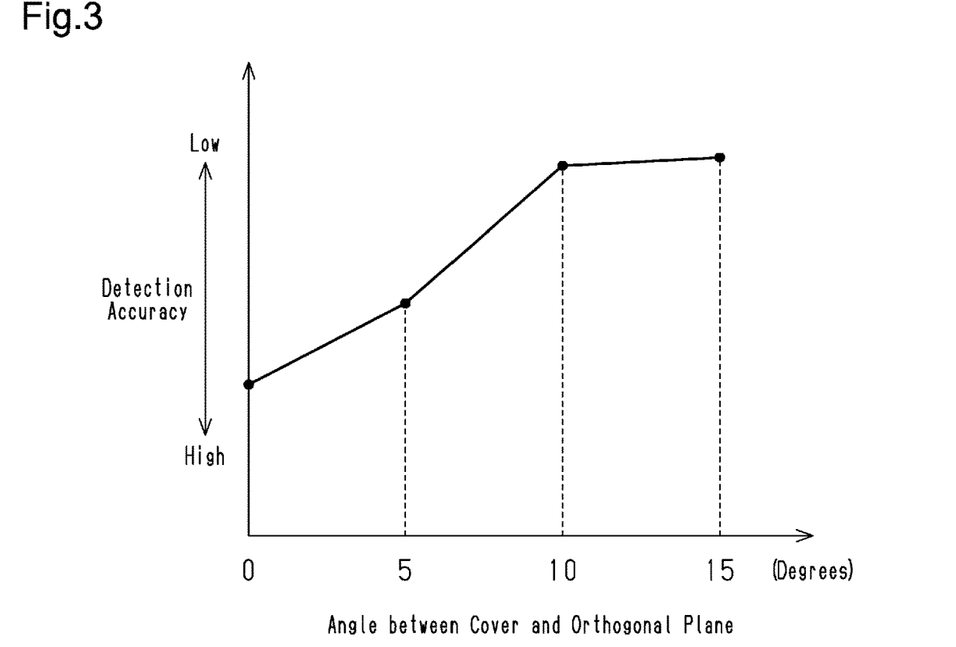
FIG. 3 is a graph showing a relationship between a detection accuracy of a millimeter wave radar device and an angle between a cover and an orthogonal plane.

This is because, as shown in the graph of FIG. 3, the detection accuracy of the millimeter wave radar device 13 deteriorates as the angle between the cover 18 and the orthogonal plane P increases from 0°. The graph of FIG. 3 indicates that when the angle between the cover 18 and the orthogonal plane P exceeds 5°, the detection accuracy of the millimeter wave radar device 13 is significantly deteriorated. Therefore, the cover 18 of the present example is disposed to be parallel to the orthogonal plane P when the shape of the cover 18 is approximated to a shape of a flat plate.

<Housing 20>

As shown in FIGS. 1 and 2, the housing 20 has millimeter wave transmissivity (electromagnetic wave transmissivity) and includes four side walls 22 (upper, lower, left, and right side walls 22) and a rear wall 23. The opening at the front end of the housing 20 is closed by the cover 18. The cover 18 and the housing 20 form a closed space. The housing 20 incorporate a flat plate-shaped substrate 24. The substrate 24 is disposed to be upright such that its front surface faces the cover 18 and its rear surface faces the rear wall 23 of the housing 20.

The substrate 24 includes a through-hole 25 in a center portion. Millimeter waves emitted from the millimeter wave radar device 13 pass through the through-hole 25. The substrate 24 is arranged to surround an emission range of the millimeter waves emitted from the millimeter wave radar device 13. In other words, the substrate 24 is adjacent to the emission range of the millimeter waves emitted from the millimeter wave radar device 13. Light emitting units 26 are provided on the front surface of the substrate 24 around the through-hole 25. The light emitting units 26 are configured to emit visible light and arranged at proper intervals. The light emitting units 26 are, for example, light-emitting diodes.

As shown in FIG. 1, the rear wall 23 of the housing 20 faces the cover 18 in the millimeter wave emission direction of the millimeter wave radar device 13 and has a shape of a flat plate. The rear wall 23 of the housing 20 is inclined such that the lower end is located rearward of the upper end. The rear wall 23 of the housing 20 is preferably disposed to form an angle A in a range of 2° to 10° with respect to the orthogonal plane P. That is, the rear wall 23 of the housing 20 is preferably disposed such that the angle A inclined in the front-rear direction with respect to the orthogonal plane P is in the range of 2° to 10°.

Figure 4:
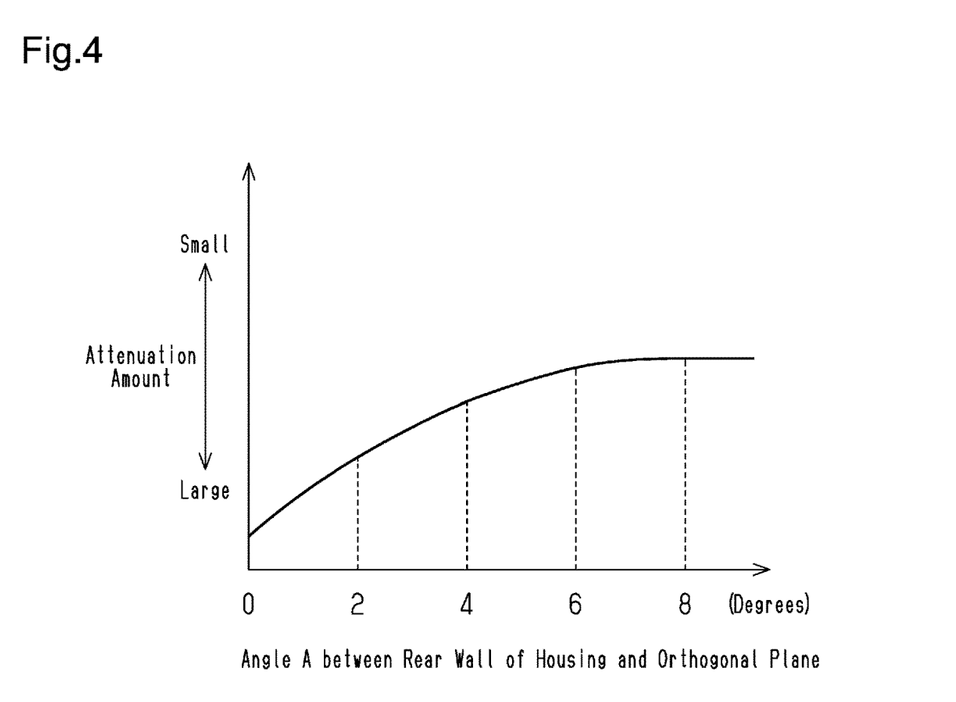
FIG. 4 is a graph showing a relationship between an attenuation amount of millimeter waves that are transmitted through a rear wall of a housing and an angle between the housing rear wall and an orthogonal plane.

This is because, as shown in the graph of FIG. 4, the attenuation amount of the millimeter waves transmitted through the rear wall 23 of the housing 20 decreases as the angle A between the rear wall 23 of the housing 20 and the orthogonal plane P increases from 0°. The graph of FIG. 4 indicates that the attenuation amount of the millimeter waves transmitted through the rear wall 23 of the housing 20 decreases as the angle A between the rear wall 23 of the housing 20 and the orthogonal plane P increases. On the other hand, if the angle A between the rear wall 23 of the housing 20 and the orthogonal plane P exceeds 10°, the space occupied by the housing 20 becomes excessively large, so that the installation space may be restricted.

Figure 5:
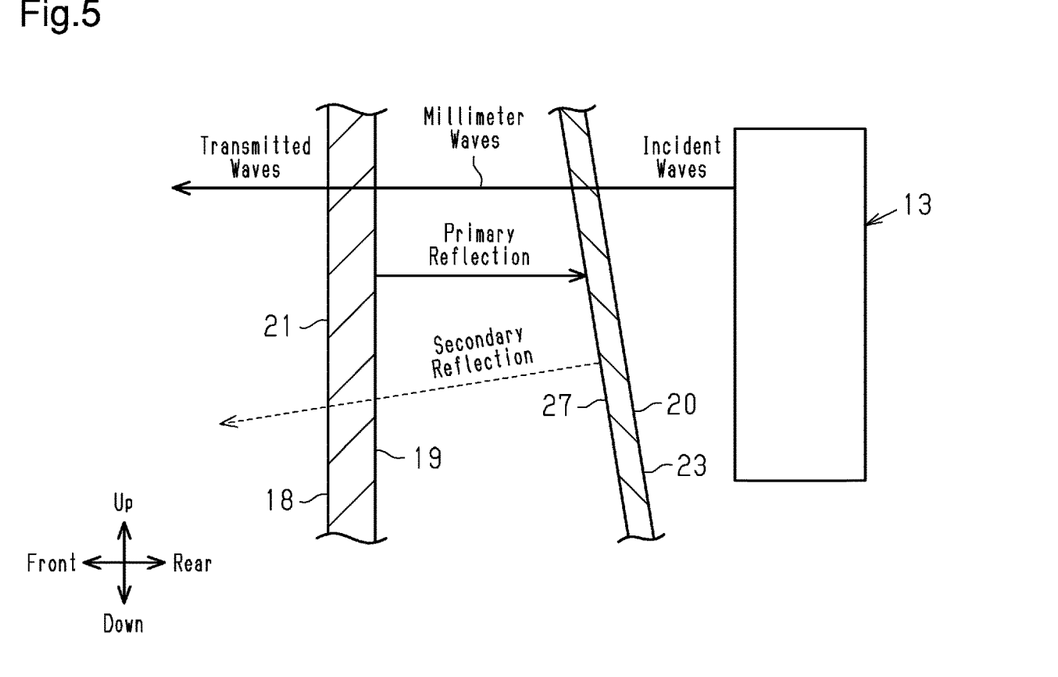
FIG. 5 is a schematic cross-sectional view showing a reflection state of millimeter waves in a case in which the housing rear wall is inclined with respect to the cover.

As shown in FIG. 5, when the rear wall 23 of the housing 20 is inclined with respect to the cover 18, the millimeter waves emitted from the millimeter wave radar device 13 reach the rear wall 23 of the housing 20 as incident waves before being transmitted through the cover 18 as transmitted waves. In this case, some of the millimeter waves are primarily reflected by the rear surface 19 of the cover 18 and then secondarily reflected by the front surface 27 of the rear wall 23 of the housing 20. At this time, since the rear wall 23 of the housing 20 is inclined with respect to the cover 18, the secondary reflection of the millimeter waves is reduced. Therefore, since the reflection component of the millimeter waves is reduced, the transmitted amount of the millimeter waves transmitted through the rear wall 23 of the housing 20 and the cover 18 increases.

Figure 6:
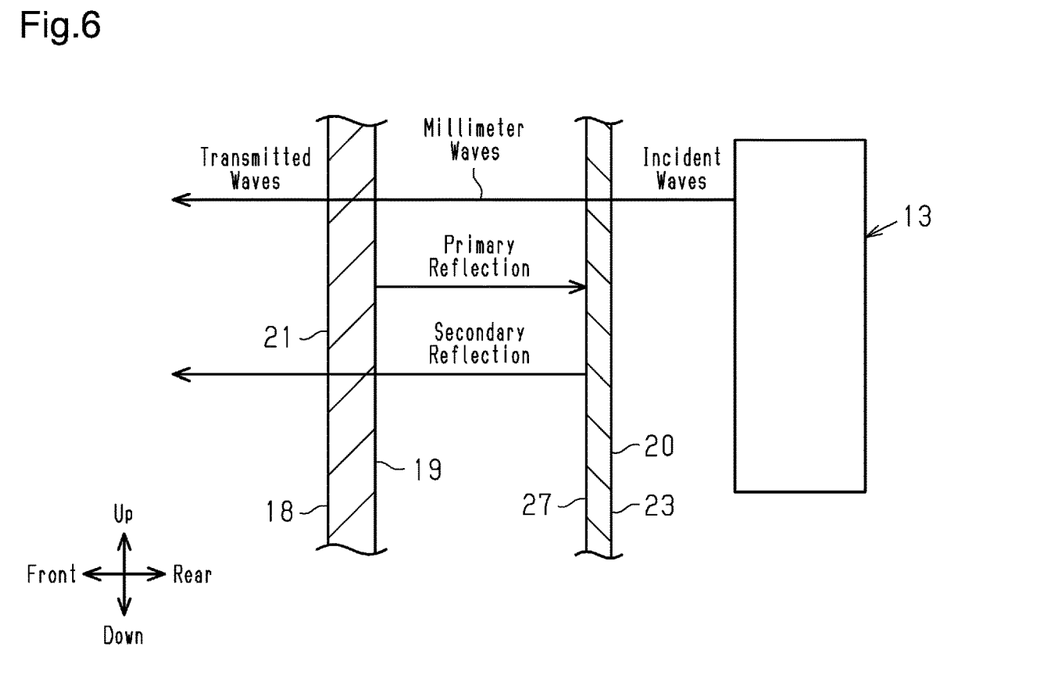
FIG. 6 is a schematic cross-sectional view showing a reflection state of millimeter waves in a case in which the housing rear wall and the cover are parallel with each other.

If the rear wall 23 of the housing 20 and the cover 18 are disposed in parallel to each other as shown in FIG. 6, the millimeter waves emitted from the millimeter wave radar device 13 are transmitted through the cover 18 as transmitted waves after reaching the rear wall 23 of the housing 20 as incident waves. In this case, some of the millimeter waves are primarily reflected by the rear surface 19 of the cover 18 and then secondarily reflected by the front surface 27 of the rear wall 23 of the housing 20. At this time, since the rear wall 23 of the housing 20 is inclined with respect to the cover 18, the secondary reflection of the millimeter waves is increased. Therefore, since the reflection component of the millimeter waves is not reduced, the transmitted amount of the millimeter waves transmitted through the rear wall 23 of the housing 20 and the cover 18 does not increase.

As shown in FIG. 1, a shortest distance B between the front surface 28 of the case 17 of the millimeter wave radar device 13 and the rear surface 29 of the rear wall 23 of the housing 20 in the millimeter wave emission direction of the millimeter wave radar device 13 is preferably in a range of 1 mm to 6 mm. If the distance B is less than 1 mm, the millimeter wave radar device 13 may come into contact with the rear wall 23 of the housing 20. If the distance B exceeds 6 mm, the attenuation amount of the millimeter waves when being transmitted through the rear wall 23 of the housing 20 becomes excessive. This is because millimeter waves are attenuated in proportion to the square of the distance.

As shown in FIG. 1, a distance C between the cover 18 and the rear wall 23 of the housing 20 at the center of the millimeter wave emission range (indicated by a solid arrow in FIG. 1) is preferably greater than or equal to 22 mm and also equal to an integer multiple of half (2 mm in this example) the wavelength λ of the millimeter waves in air (4 mm in this example). The distance C in the present example is also the distance between the center of the cover 18 and the center of the rear wall 23 of the housing 20.

Figure 7:
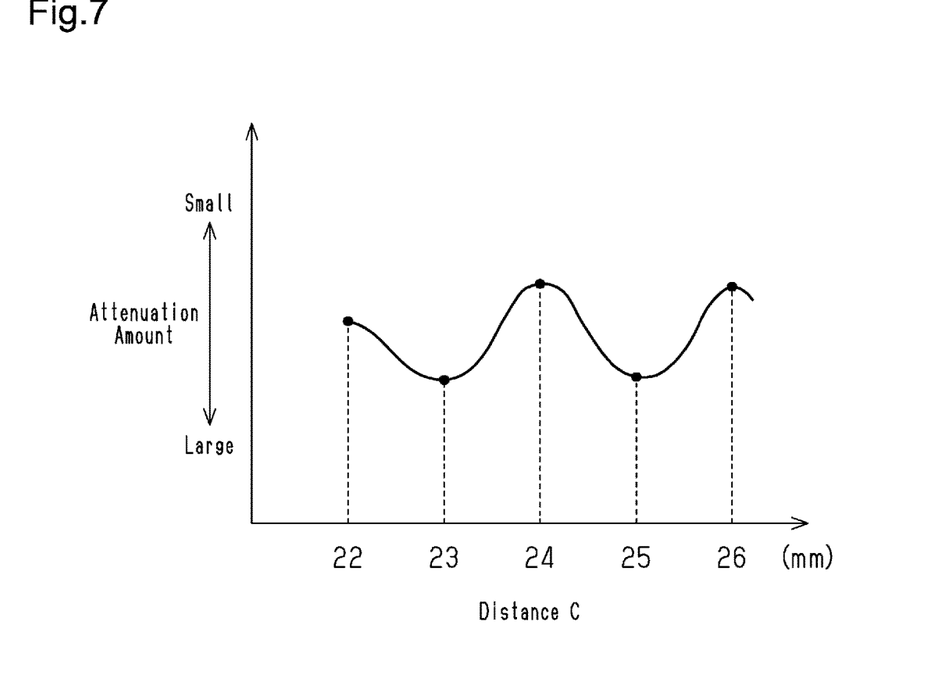
FIG. 7 is a graph showing a relationship between an attenuation amount of millimeter waves that are transmitted through the cover and a distance from the cover to the housing rear wall at a center of an emission range of the millimeter waves.

The distance C in this example is (22+2n) mm (n being an integer greater than or equal to 0). As shown in the graph of FIG. 7, when the distance C is 22 mm, 24 mm, 26 mm, and so on, the attenuation amount of the millimeter waves transmitted through the cover 18 is relatively small. When the distance C is less than 22 mm, the space in the housing 20 may be insufficient, and thus the visible light from the light emitting units 26 may not spread in a favorable manner. Therefore, the visible light emitted from the light emitting units 26 may become uneven in the housing 20, and thus the cover 18 may not be uniformly illuminated.

Figure 8:
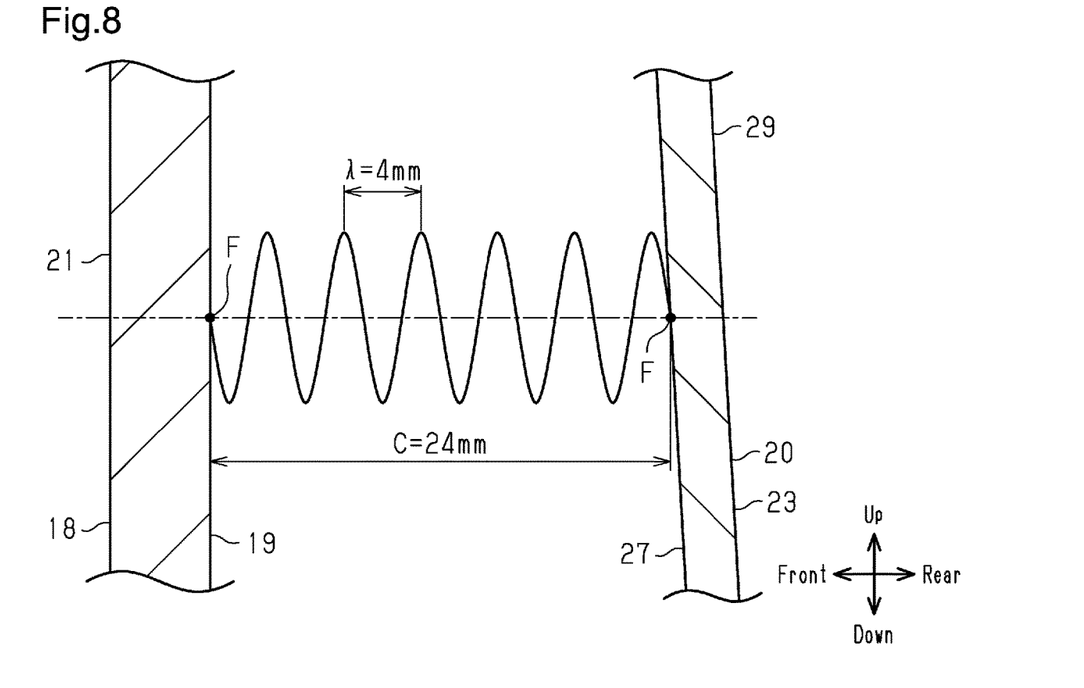
FIG. 8 is a schematic cross-sectional view showing a waveform of millimeter waves when the distance from the cover to the housing rear wall at the center of the emission range of the millimeter waves is 24 mm.

When the distance C is, for example, 24 mm as shown in FIG. 8, the position of the waveform of the millimeter waves when the millimeter waves have been transmitted through the rear wall 23 of the housing 20 and the position of the waveform of the millimeter waves when reaching the cover 18 are both the position of a node F. Therefore, a phase difference of the millimeter waves does not occur between the position of the waveform of the millimeter waves when having been transmitted through the rear wall 23 of the housing 20 and the position of the waveform of the millimeter waves when reaching the cover 18. This reduces the loss of the millimeter waves when transmitted through the cover 18. The long-dash short-dash line in FIG. 8 represents the center of the millimeter wave emission range.

Figure 9:
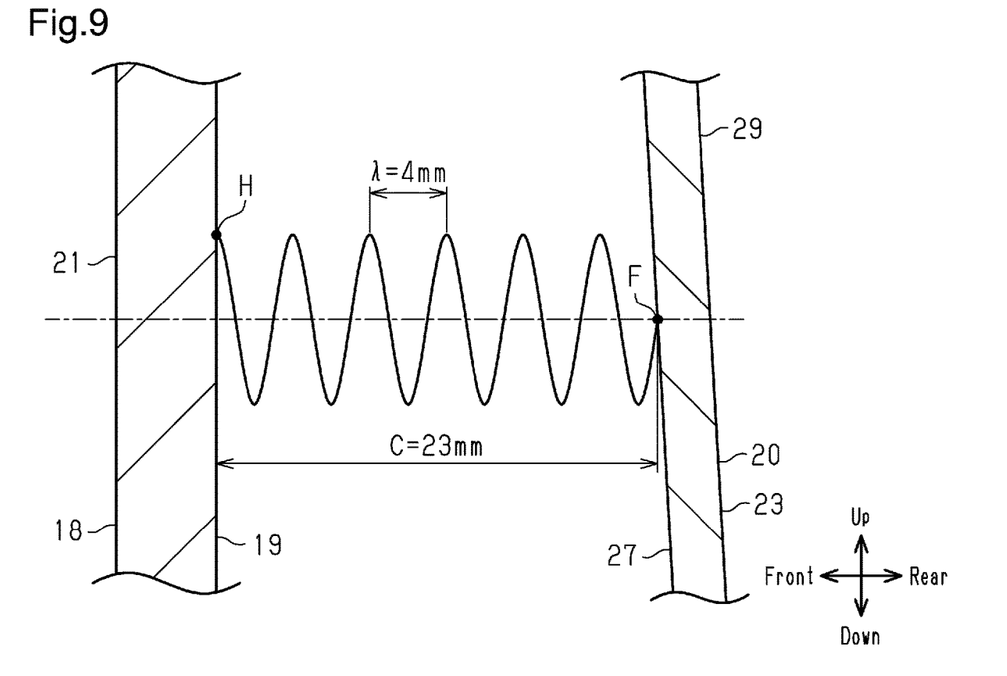
FIG. 9 is a schematic cross-sectional view showing a waveform of millimeter waves when the distance from the cover to the housing rear wall at the center of the emission range of the millimeter waves is 23 mm.

In contrast, when the distance C is, for example, 23 mm as shown in FIG. 9, the position of the waveform of the millimeter waves when having been transmitted through the rear wall 23 of the housing 20 is the position of a node F, but the position of the waveform of the millimeter waves when reaching the cover 18 is the position of an antinode H. Therefore, a phase difference of the millimeter waves occurs between the position of the waveform of the millimeter waves when having been transmitted through the rear wall 23 of the housing 20 and the position of the waveform of the millimeter waves when reaching the cover 18. This increases the loss of the millimeter waves when transmitted through the cover 18. The long-dash short-dash line in FIG. 9 represents the center of the millimeter wave emission range.

<Electromagnetic Wave Absorber 31>

Figure 10:
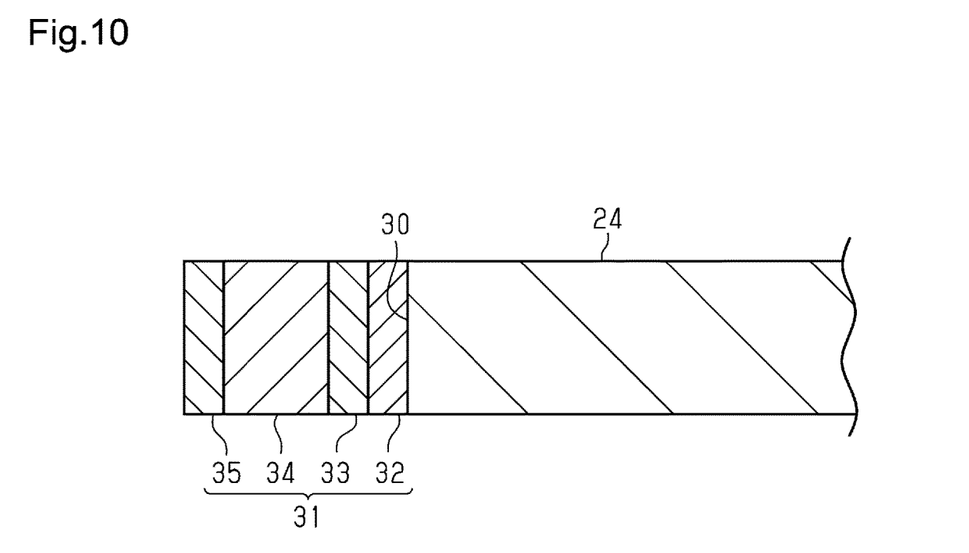
FIG. 10 is an enlarged cross-sectional view of an electromagnetic wave absorber provided on a peripheral surface of a through-hole in a substrate.

As shown in FIGS. 1 and 10, an electromagnetic wave absorber 31, which absorbs millimeter waves, is provided at an end of the substrate 24 that faces the millimeter wave emission range. Specifically, the electromagnetic wave absorber 31 is provided at least at a part of a peripheral surface 30 of the through-hole 25 of the substrate 24. In this example, the electromagnetic wave absorber 31 is provided over the entire peripheral surface 30 of the through-hole 25 of the substrate 24. However, the electromagnetic wave absorber 31 may be provided partially on the peripheral surface 30 of the through hole 25 of the substrate 24.

The electromagnetic wave absorber 31 includes, for example, a laminate having a four-layer structure. The four layers forming the electromagnetic wave absorber 31 are an adhesive layer 32, a reflective layer 33, a dielectric layer 34, and an impedance adjustment layer 35 in that order from the peripheral surface 30 of the through-hole 25. The thickness of the electromagnetic wave absorber 31 in the stacking direction is set in a range of 0.5 mm to 1.5 mm, for example. The electromagnetic wave absorber 31 is adhered to the peripheral surface 30 of the through-hole 25 at the adhesive layer 32.

The adhesive layer 32 includes, for example, an acrylic double-sided adhesive tape or an adhesive. The reflective layer 33 is made of, for example, aluminum. The dielectric layer 34 is made of, for example, polyethylene terephthalate (PET). The impedance adjustment layer 35 is made of, for example, indium tin oxide (ITO).

Figure 11:
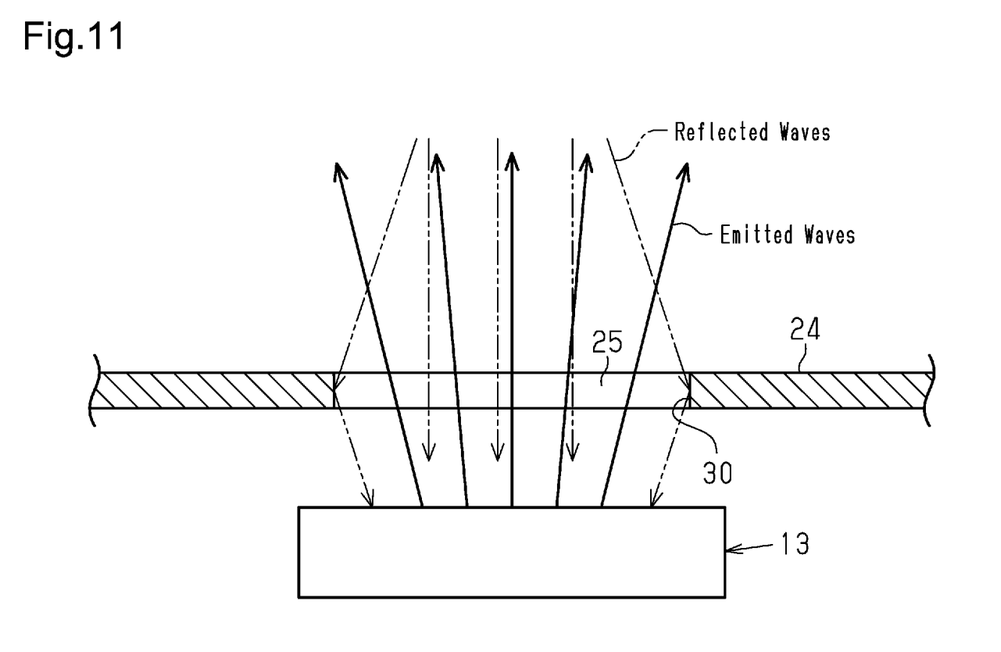
FIG. 11 is a schematic cross-sectional view showing a state in which emitted waves and reflected waves of millimeter waves are transmitted through a through-hole in a substrate having no electromagnetic wave absorber on the peripheral surface of the through-hole.

FIG. 11 illustrates a case in which the electromagnetic wave absorber 31 is not provided on the peripheral surface 30 of the through-hole 25 of the substrate 24. In this case, some of the reflected waves of the millimeter waves emitted from the millimeter wave radar device 13 and reflected by a detection target such as an object outside the land vehicle 11 hits the peripheral surface 30 and is scattered. This attenuates the reflected waves of the millimeter waves received by the millimeter wave radar device 13, and thus reduces the detection accuracy of the millimeter wave radar device 13 when detecting the detection target.

Figure 12:
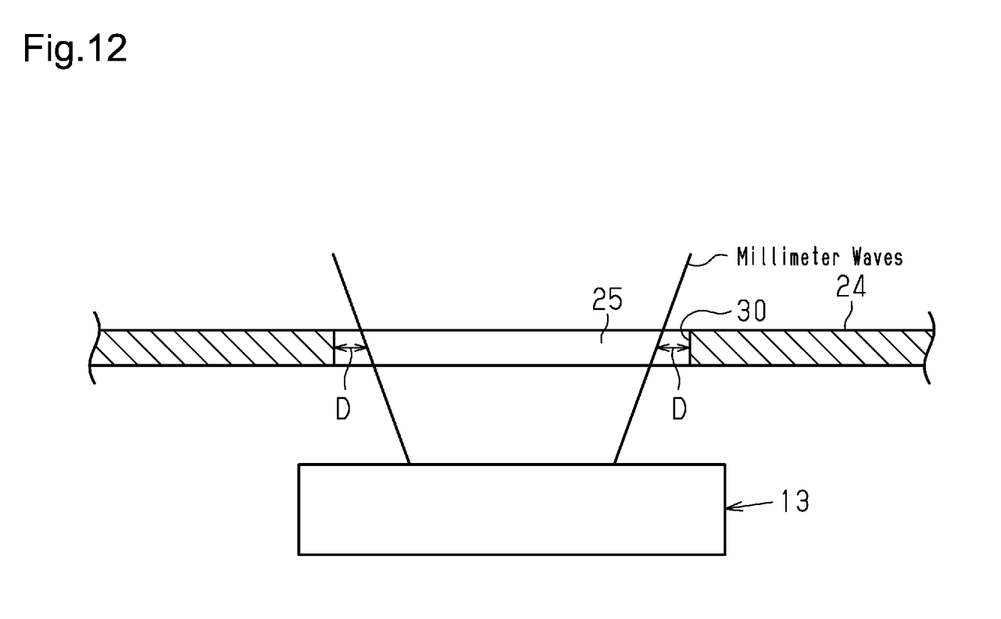
FIG. 12 is a schematic cross-sectional view showing a distance between the emission range of millimeter waves and a through-hole of a substrate in which no electromagnetic wave absorber is provided on the peripheral surface of the through-hole.

Therefore, as shown in FIG. 12, it is preferable to set a distance D between the peripheral surface 30 of the through-hole 25 of the substrate 24 and the emission range of the millimeter waves from the millimeter wave radar device 13 to be greater than or equal to 3 mm. The graph of FIG. 13 indicates that the attenuation amount of the reflected waves of the millimeter waves received by the millimeter wave radar device 13 is effectively reduced by setting the distance D to be greater than or equal to 3 mm.

Figure 13:
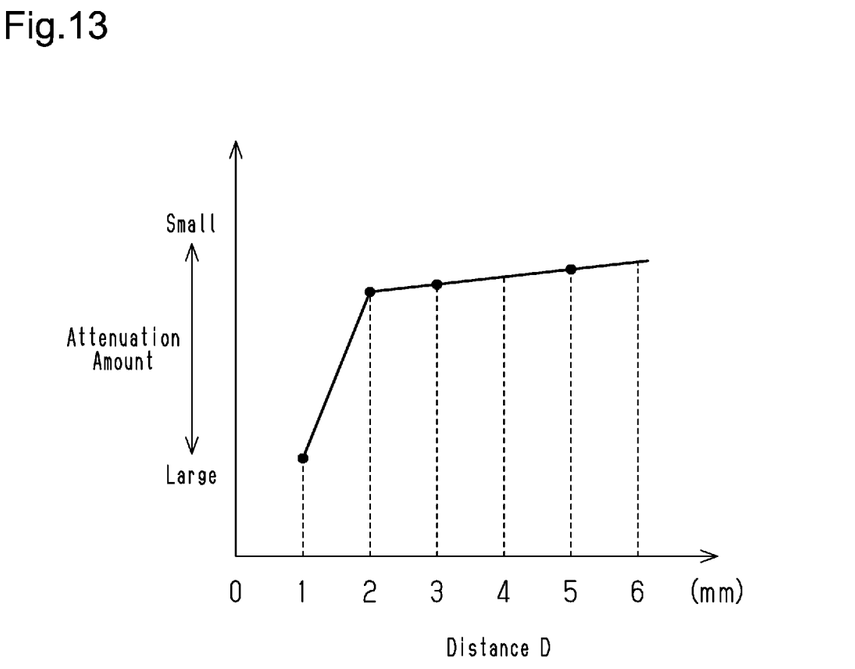
FIG. 13 is a graph showing a relationship between an attenuation amount of reflected waves of the millimeter waves received by the millimeter wave radar device and a distance between the emission range of millimeter waves and a through-hole of a substrate in which no electromagnetic wave absorber is provided on the peripheral surface of the through-hole.

That is, the graph of FIG. 13 indicates that setting the distance D to be greater than or equal 3 mm reduces the reflected waves of the millimeter waves that are scattered by hitting the peripheral surface 30. When the reflected waves of the millimeter waves that are scattered by hitting the peripheral surface 30 are reduced, some of the scattered reflected waves are prevented from entering the millimeter wave radar device 13 as unnecessary millimeter waves. The graph of FIG. 13 indicates that the attenuation amount of the reflected waves of the millimeter waves received by the millimeter wave radar device 13 is not significantly reduced if the distance D is set to be less than or equal to 2 mm.

Figure 14:
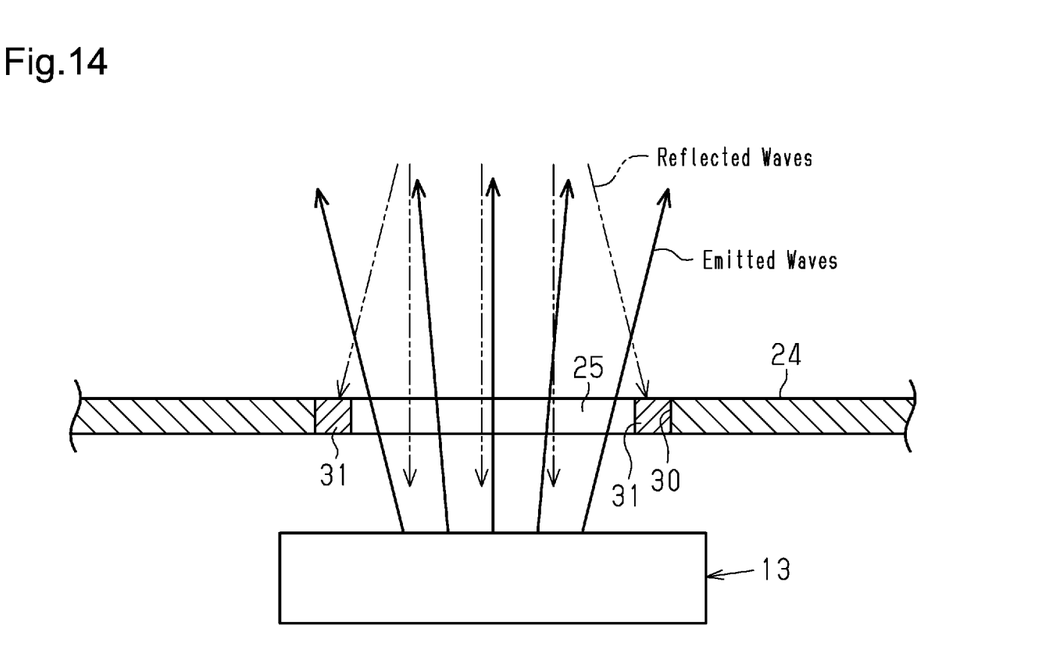
FIG. 14 is a schematic cross-sectional view showing a state in which emitted waves and reflected waves of millimeter waves are transmitted through a through-hole in a substrate having an electromagnetic wave absorber on the peripheral surface of the through-hole.

FIG. 14 illustrates a case in which the electromagnetic wave absorber 31 is provided on the peripheral surface 30 of the through-hole 25 of the substrate 24. In this case, some of the reflected waves of the millimeter waves emitted from the millimeter wave radar device 13 and reflected by a detection target such as an object outside the land vehicle 11 is absorbed by the electromagnetic wave absorber 31. Thus, the reflected waves are hardly scattered by hitting the peripheral surface 30. Therefore, the reflected waves scattered by the peripheral surface 30 hardly enter the millimeter wave radar device 13 as unnecessary millimeter waves.

<Operation of Millimeter Wave Radar Device 13>

When millimeter waves are emitted forward from the millimeter wave radar device 13 illustrated in FIG. 1, the millimeter waves are transmitted through the rear wall 23 of the housing 20, the through-hole 25 of the substrate 24, and the cover 18. The transmitted millimeter waves are reflected by a detection target in front of the land vehicle 11 including a leading land vehicle, a pedestrian, and the like, and then are transmitted again through the cover 18, the through-hole 25 of the substrate 24, and the rear wall 23 of the housing 20 to be received by the millimeter wave radar device 13.

Based on the millimeter waves, which have been emitted and received, the millimeter wave radar device 13 recognizes the detection target and detects the distance, the relative velocity, and the like between the detection target and the land vehicle 11. At this time, since the angle between the cover 18 and the orthogonal plane P is in the range of 0° to 5°, the detection accuracy of the millimeter wave radar device 13 when detecting the detection target is ensured.

In addition, since the angle A between the rear wall 23 of the housing 20 and the orthogonal plane P is in the range of 2° to 10°, the space occupied by the housing 20 does not become excessively large, and the reflection component of the millimeter waves on the rear wall 23 of the housing 20 is reduced. Accordingly, the transmitted amount of the millimeter waves transmitted through the cover 18 and the rear wall 23 of the housing 20 increases, and thus the attenuation amount of the millimeter waves transmitted through the land vehicle exterior component 14 is reduced.

Furthermore, since the cover 18 is illuminated by visible light emitted from the light emitting units 26 on the substrate 24, the aesthetic appeal of the cover 18 is improved, and thus the aesthetic appeal of the land vehicle exterior component 14 is improved. In this manner, the land vehicle exterior component 14 reduces the attenuation amount of the transmitted millimeter waves while improving the aesthetic appeal by illuminating the cover 18.

Advantages of Embodiment

The above-described embodiment achieves the following advantages.

(1) The land vehicle exterior component 14 is configured to be used in the land vehicle 11, on which the millimeter wave radar device 13, which emits and receives millimeter waves, is mounted. The land vehicle exterior component 14 includes the cover 18, the housing 20, and the substrate 24. The cover 18 is configured to be disposed in front of the millimeter wave radar device 13 in the emission direction of millimeter waves. The housing 20 covers the rear surface 19 of the cover 18. The substrate 24 is arranged in the housing 20. The substrate 24 is provided with the light emitting units 26, which are configured to emit visible light. The cover 18 forms an angle in the range of 0° to 5° with respect to the orthogonal plane P, which is orthogonal to the emission direction. The rear wall 23 of the housing 20 faces the cover 18 in the emission direction and forms the angle A in the range of 2° to 10° with respect to the orthogonal plane P.

The above-described configuration, in which the angle between the cover 18 and the orthogonal plane P is in the range of 0° to 5°, ensures the detection accuracy of the millimeter wave radar device 13 when detecting a detection target. In addition, since the angle A between the rear wall 23 of the housing 20 and the orthogonal plane P is in the range of 2° to 10°, the reflection component of the millimeter waves on the rear wall 23 of the housing 20 is reduced. This increases the transmitted amount of the millimeter waves transmitted through the cover 18 and the housing 20, and thus reduces the attenuation amount of the millimeter waves transmitted through the land vehicle exterior component 14.

(2) In the land vehicle exterior component 14, the substrate 24 is disposed adjacent to the emission range of the millimeter waves. The electromagnetic wave absorber 31, which absorbs millimeter waves, is provided on the peripheral surface 30 of the through-hole 25, which is an end of the substrate 24 that faces the millimeter wave emission range.

With the above-described configuration, the millimeter wave radar device 13 emits millimeter waves, and the emitted millimeter waves hit a detection target and are reflected. When the reflected waves hit the peripheral surface 30 of the through-hole 25 of the substrate 24, the reflected waves are absorbed by the electromagnetic wave absorber 31. Therefore, when hitting the peripheral surface 30 of the through-hole 25 of the substrate 24, the reflected waves are prevented from being scattered. Such reduction in the attenuation of the reflected waves improves the detection accuracy of the millimeter wave radar device 13 when detecting a detection target.

(3) If the electromagnetic wave absorber 31 is omitted from the land vehicle exterior component 14, it is preferable that the distance D greater than or equal to 3 mm be provided between the emission range of the millimeter waves and the peripheral surface 30 of the through-hole 25, which is the end of the substrate 24 that faces the emission range of the millimeter waves.

With the above-described configuration, the millimeter wave radar device 13 emits millimeter waves, and the emitted millimeter waves hit a detection target and are reflected. When the reflected waves hit the peripheral surface 30 of the through-hole 25 of the substrate 24, the reflected waves are effectively prevented from being scattered. Such reduction in the attenuation of the reflected waves improves the detection accuracy of the millimeter wave radar device 13 when detecting a detection target. In addition, the above-described configuration restricts the emitted waves, which are millimeter waves emitted from the millimeter wave radar device 13, from hitting the peripheral surface 30 of the through-hole 25 of the substrate 24. Therefore, when hitting the peripheral surface 30 of the through-hole 25 of the substrate 24, the emitted waves are prevented from being scattered. Such reduction in the attenuation of the emitted waves improves the detection accuracy of the millimeter wave radar device 13 when detecting a detection target.

(4) The electromagnetic wave radar system 12 includes the land vehicle exterior component 14 and the millimeter wave radar device 13. The distance C between the cover 18 and the rear wall 23 of the housing 20 at the center of the millimeter wave emission range is greater than or equal to 22 mm and equal to an integer multiple of half of the wavelength $\lambda$ of the millimeter waves in air.

With the above-described configuration, since the distance C between the cover 18 and the rear wall 23 of the housing 20 at the center of the emission range of the millimeter waves is greater than or equal to 22 mm, visible light is evenly emitted from the light emitting units 26 in the housing 20. In addition, since the distance C between the cover 18 and the rear wall 23 of the housing 20 at the center of the millimeter wave emission range is equal to an integer multiple of half of the wavelength $\lambda$ of the millimeter waves in air, no phase difference occurs between the millimeter waves on the front surface 27 of the rear wall 23 of the housing 20 and the millimeter waves on the rear surface 19 of the cover 18. This configuration reduces the attenuation amount of the millimeter waves transmitted through the land vehicle exterior component 14. Therefore, the attenuation amount of the millimeter waves transmitted through the land vehicle exterior component 14 is reduced, while the visible light is uniformly emitted from the light emitting units 26 in the housing 20.

Modifications

The above-described embodiment may be modified as follows. The above-described embodiment and the following modifications can be combined as long as the combined modifications remain technically consistent with each other.

In the substrate 24, the through-hole 25 may be changed to a cutout.

The electromagnetic wave absorber 31 may be omitted.

The cover 18 does not necessarily need to be curved, but may be formed into a flat plate.

The cover 18 may be an ornament, a mark, or the like other than the emblem.

The radar device that emits and receives electromagnetic waves to detect an outside object is not limited to a front monitoring device, but may be a device that monitors the situation behind the vehicle, the situation on the sides of the front part of the vehicle, or the situation on the sides of the rear part of the vehicle. In these cases, the land vehicle exterior component 14 is located forward of the device in the emission direction of millimeter waves.

The frequencies of the millimeter waves used in the millimeter wave radar device 13 are not limited to 77 GHz, but may be changed.

The electromagnetic waves emitted and received by the radar device may include electromagnetic waves such as infrared rays in addition to millimeter waves.

The vehicle exterior component may be used in a case in which a radar device that emits and receives electromagnetic waves is mounted on a vehicle of a type different from the land vehicle 11, for example, an electric train, an aircraft, or a ship.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle exterior component configured to be used in a vehicle on which a radar device is mounted, the radar device emitting and receiving electromagnetic waves, the vehicle exterior component comprising:
    a cover configured to be arranged forward of the radar device in an emission direction of the electromagnetic waves;
    a housing that covers a rear surface of the cover; and
    a substrate arranged in the housing, wherein
    the substrate includes a light emitting unit configured to emit visible light,
    the cover forms an angle in a range of 0° to 5° with respect to an orthogonal plane that is orthogonal to the emission direction, and
    a rear wall of the housing faces the cover in the emission direction and forms an angle in a range of 2° to 10° with respect to the orthogonal plane.

2. The vehicle exterior component according to claim 1, wherein
    the substrate is disposed adjacent to an emission range of the electromagnetic waves, and
    the vehicle exterior component is configured such that
        an electromagnetic wave absorber is provided at an end of the substrate that faces the emission range of the electromagnetic waves, the electromagnetic wave absorber absorbing the electromagnetic waves, or
        a distance exists between the end of the substrate that faces the emission range of the electromagnetic waves and the emission range of the electromagnetic waves.

3. A vehicle exterior component configured to be used in a vehicle on which a radar device is mounted, the radar device emitting and receiving electromagnetic waves, the vehicle exterior component comprising:
    a cover configured to be arranged forward of the radar device in an emission direction of the electromagnetic waves;
    a housing that covers a rear surface of the cover; and
    a substrate arranged in the housing, wherein
    the substrate includes a light emitting unit configured to emit visible light,
    the substrate is disposed adjacent to an emission range of the electromagnetic waves, and
    the vehicle exterior component is configured such that
        an electromagnetic wave absorber is provided at an end of the substrate that faces the emission range of the electromagnetic waves, the electromagnetic wave absorber absorbing the electromagnetic waves, or
        a distance exists between the end of the substrate that faces the emission range of the electromagnetic waves and the emission range of the electromagnetic waves.

4. An electromagnetic wave radar system, comprising:
    the vehicle exterior component according to claim 1; and
    the radar device,
    wherein a distance between the cover and the rear wall of the housing at a center of the emission range of the millimeter waves is equal to an integer multiple of half of a wavelength of the millimeter waves in air.

5. An electromagnetic wave radar system, comprising:
    the vehicle exterior component according to claim 3; and
    the radar device,
    wherein a distance between the cover and a rear wall of the housing at a center of the emission range of the millimeter waves is equal to an integer multiple of half of a wavelength of the millimeter waves in air.

* * * * *